US012489867B2

(12) United States Patent
Agrawal et al.

(10) Patent No.: US 12,489,867 B2
(45) Date of Patent: Dec. 2, 2025

(54) CONTROLLING DISPLAY OF CONTENT BASED ON SCREEN SHARING IN A VIDEO CONFERENCE SESSION

(71) Applicant: Motorola Mobility LLC, Chicago, IL (US)

(72) Inventors: Amit Kumar Agrawal, Bangalore (IN); Shuaib Puzhakkal Kavalathara, Malappuram (IN)

(73) Assignee: Motorola Mobility LLC, Chicago, IL (US)

( * ) Notice: Subject to any disclaimer, the term of this patent is extended or adjusted under 35 U.S.C. 154(b) by 311 days.

(21) Appl. No.: 18/110,473

(22) Filed: Feb. 16, 2023

(65) Prior Publication Data

US 2024/0283893 A1    Aug. 22, 2024

(51) Int. Cl.
*H04N 7/15* (2006.01)
*G06F 3/14* (2006.01)
*H04N 7/14* (2006.01)

(52) U.S. Cl.
CPC ........... *H04N 7/152* (2013.01); *G06F 3/1454* (2013.01); *H04N 7/147* (2013.01)

(58) Field of Classification Search
CPC .... H04N 7/152; H04N 7/147; H04N 1/00442; H04N 7/15; H04N 7/141; H04N 7/155; G06F 3/1454; G06F 3/04886; G06F 2203/04803; G06F 3/0484; G06F 3/0482; G06F 3/14; G09G 2370/16; G09G 2354/00; G09G 5/005; G09G 5/14; G06T 2200/16; G06T 3/4092; H04M 3/567; H04L 65/403; H04L 65/4015; H04L 65/401; G09B 5/08
See application file for complete search history.

(56) References Cited

U.S. PATENT DOCUMENTS

| | | | |
|---|---|---|---|
| 9,002,938 B2 | 4/2015 | Bank et al. | |
| 9,843,673 B1 | 12/2017 | Chug et al. | |
| 10,038,877 B1 | 7/2018 | Faulkner et al. | |
| 10,282,088 B2 * | 5/2019 | Kim | G06F 3/0481 |
| 10,547,654 B2 | 1/2020 | Faulkner | |

(Continued)

OTHER PUBLICATIONS

"Notice of Allowance", U.S. Appl. No. 17/209,157, Feb. 9, 2022, 8 pages.

(Continued)

*Primary Examiner* — Duc Nguyen
*Assistant Examiner* — Assad Mohammed
(74) *Attorney, Agent, or Firm* — FIG. 1 Patents

(57) ABSTRACT

In aspects of controlling display of content based on screen sharing in a video conference session, a video conference session is determined to be active on a computing device in a screen sharing mode. In the screen sharing mode, a user of a computing device shares content displayed on a display screen associated with the computing device with a remote user connected to the video conference session via a remote device. The remote user is then detected as having entered the screen sharing mode on the remote device, which causes the screen sharing mode to end on the computing device. Then, the remote user is detected as having ended the screen sharing mode on the remote device. In response to the screen sharing mode ending on the remote device, a prompt is displayed on the display screen that is selectable to resume the screen sharing mode on the computing device.

20 Claims, 9 Drawing Sheets

(56) References Cited

U.S. PATENT DOCUMENTS

| | | | |
|---|---|---|---|
| 11,297,281 B1 | 4/2022 | Agrawal et al. | |
| 11,838,683 B2 | 12/2023 | Agrawal | |
| 11,843,896 B2 | 12/2023 | Agrawal | |
| 2004/0252185 A1* | 12/2004 | Vernon | H04L 65/403 |
| | | | 348/E7.083 |
| 2012/0278824 A1 | 11/2012 | Patil et al. | |
| 2013/0198654 A1 | 8/2013 | Jones et al. | |
| 2014/0040369 A1 | 2/2014 | Jones et al. | |
| 2014/0047339 A1* | 2/2014 | Epstein | G06F 3/023 |
| | | | 715/719 |
| 2014/0362165 A1* | 12/2014 | Ackerman | G06Q 10/10 |
| | | | 348/14.07 |
| 2014/0365919 A1* | 12/2014 | Shaw | H04L 12/1822 |
| | | | 715/753 |
| 2015/0244814 A1* | 8/2015 | Khalatian | H04L 67/141 |
| | | | 715/753 |
| 2015/0312185 A1 | 10/2015 | Langholz et al. | |
| 2015/0365306 A1 | 12/2015 | Chaudhri et al. | |
| 2016/0065894 A1 | 3/2016 | Lin et al. | |
| 2017/0249919 A1* | 8/2017 | Bae | H04N 1/00442 |
| 2018/0013980 A1 | 1/2018 | Oyman | |
| 2018/0024805 A1* | 1/2018 | Nakagawa | G06F 21/84 |
| | | | 709/203 |
| 2018/0203557 A1 | 7/2018 | Kim | |
| 2019/0052473 A1* | 2/2019 | Soni | G09B 21/009 |
| 2019/0354335 A1* | 11/2019 | Yoshida | G09G 5/006 |
| 2019/0364261 A1 | 11/2019 | Hwang et al. | |
| 2019/0370457 A1* | 12/2019 | Shultz | G06F 21/31 |
| 2020/0174745 A1* | 6/2020 | Jung | G06F 3/04812 |
| 2020/0322395 A1 | 10/2020 | Copley et al. | |
| 2020/0336801 A1 | 10/2020 | Harviainen et al. | |
| 2021/0029326 A1 | 1/2021 | Oyman et al. | |
| 2021/0044982 A1 | 2/2021 | Damnjanovic et al. | |
| 2021/0306665 A1 | 9/2021 | Hourunranta et al. | |
| 2022/0012005 A1* | 1/2022 | Soong | H04L 65/764 |
| 2022/0303499 A1 | 9/2022 | Agrawal | |
| 2023/0083581 A1* | 3/2023 | Beckmann | H04N 7/147 |
| | | | 715/730 |
| 2024/0201931 A1* | 6/2024 | Klaghofer | G06F 21/629 |

OTHER PUBLICATIONS

U.S. Appl. No. 17/701,016, "Non-Final Office Action", U.S. Appl. No. 17/701,016, Dec. 20, 2022, 21 pages.

U.S. Appl. No. 17/701,042, "Non-Final Office Action", U.S. Appl. No. 17/701,042, Feb. 22, 2023, 21 pages.

U.S. Appl. No. 17/701,016, "Corrected Notice of Allowability", U.S. Appl. No. 17/701,016, Nov. 8, 2023, 2 pages.

U.S. Appl. No. 17/701,016, "Final Office Action", U.S. Appl. No. 17/701,016, Aug. 23, 2023, 12 pages.

U.S. Appl. No. 17/701,016, "Notice of Allowance", U.S. Appl. No. 17/701,016, Oct. 2, 2023, 9 pages.

U.S. Appl. No. 17/701,042, "Corrected Notice of Allowability", U.S. Appl. No. 17/701,042, Nov. 15, 2023, 2 pages.

U.S. Appl. No. 17/701,042, "Final Office Action", U.S. Appl. No. 17/701,042, Aug. 29, 2023, 12 pages.

U.S. Appl. No. 17/701,042, "Notice of Allowance", U.S. Appl. No. 17/701,042, Oct. 2, 2023, 9 pages.

* cited by examiner

CONTROLLING DISPLAY OF CONTENT BASED ON SCREEN SHARING IN A VIDEO CONFERENCE SESSION

BACKGROUND

With the proliferation of the "work from home" lifestyle, video conferencing has rapidly expanded and become a primary means for many types of social, networking, meeting, and employment interactions. Generally, devices such as smart devices, mobile devices (e.g., cellular phones, tablet devices, smartphones), laptop computers, consumer electronics, and the like have become increasingly commonplace and used extensively to facilitate the everyday demands of video conferencing. Although quite useful for remote working, remote learning, and social distanced interactions, as well as simulating "in-person" communications that are lacking from the "work from home" lifestyle, it is inherently difficult to facilitate and maintain user engagement with video conferencing, and particularly, for extended periods of time.

BRIEF DESCRIPTION OF THE DRAWINGS

Aspects of controlling display of content based on screen sharing in a video conference session are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
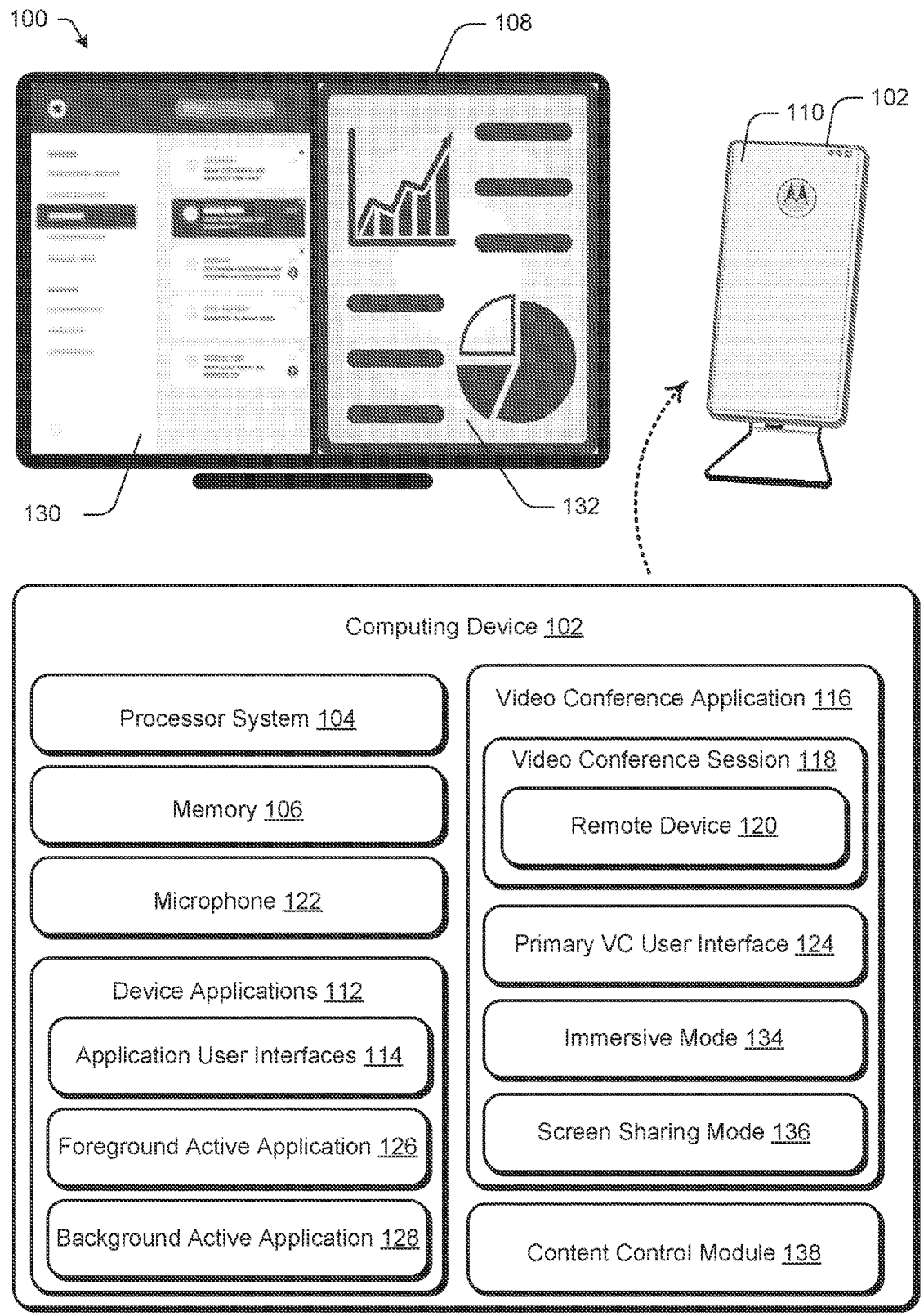
FIG. 1 illustrates an example environment in which aspects of controlling display of content based on screen sharing in a video conference session can be implemented.

Techniques for controlling display of content based on screen sharing in a video conference session are described herein as implemented by a content control module of a computing device. In accordance with the described techniques, the computing device includes one or more display screens, such as an integrated display screen of the computing device and/or an external display screen to which the computing device is communicatively linked. Further, the computing device includes a video conference application which represents functionality to enable a user to initiate or join a video conference session with one or more remote users connected to the video conference session via one or more remote devices. While the video conference session is active, a primary video conference user interface of the video conference application may be displayed on the one or more display screens. In at least one implementation, however, the user may participate in the video conference session in an immersive mode, in which the video conference session is active, but the primary video conference session is removed from display on the one or more display screens. Additionally, while the video conference session is active, the user may enter into a screen sharing mode to share content displayed on the one or more display screens of the computing device with the one or more remote users. By way of example, the one or more remote devices connected to the video conference session display the shared content, as displayed on the one or more display screens of the computing device.

While the video conference session is active on the computing device in the screen sharing mode and the immersive mode, a remote user can initiate screen sharing via a remote device. By doing so, the content displayed on the one or more display screens of the computing device ceases to be shared to participants of the video conference session, and instead, the content displayed on the remote device is shared to participants of the video conference session. Due to this, the user may be wholly unaware that the screen sharing mode has been terminated, particularly when the user was sharing the displayed content in the immersive mode. The remote user can then end the screen sharing mode on the remote device such that no content is being shared to the video conference session using the screen sharing mode. While mistakenly believing that the screen sharing mode is still active on the computing device, the user may begin addressing content that was previously shared in the screen sharing mode. Situations like these can lead to awkward moments in the video conference session, wasted time, participant confusion, and the like.

To overcome these drawbacks of conventional video conferencing techniques, the content control module determines that a video conference session is active on the computing device in the screen sharing mode and in the immersive mode. In other words, the content control module detects that the user is sharing displayed content to the video conference session while the primary video conference user interface is removed from display on the one or more display screens. Further, the content control module determines that the remote user has entered the screen sharing mode on the remote device, thereby ending the screen sharing mode on the computing device. In response to the remote user ending the screen sharing mode on the computing device (e.g., by initiating the screen sharing mode on the remote device) while the user of the computing device is participating in the video conference session in the immersive mode, the content control module surfaces the primary video conference user interface to at least partially cover the content that was previously shared in the screen sharing mode. The surfaced primary video conference user interface serves as a reminder that the screen sharing session is no longer active on the computing device.

Furthermore, the content control module detects that the remote user has ended the screen sharing mode on the remote device. Thus, after the screen sharing mode is ended on the remote device, it is determined that the user was previously sharing content displayed on the one or more display screens with other participants of the video conference session, the screen sharing mode was terminated on the computing device by the remote user entering the screen sharing mode on the remote device, and the screen sharing mode on the remote device has since ended such that no content is being shared to the video conference session using the screen sharing mode. In response, the content control module displays a prompt on the one or more display screens of the computing device. The prompt includes a user interface element that is selectable to resume sharing the content that was shared by the computing device in the screen sharing mode prior to the screen sharing mode being terminated. The prompt serves as a reminder that the screen sharing mode is not active on the computing device and enables the user to quickly resume sharing the content that was previously being shared in the screen sharing mode. Therefore, the described techniques alleviate the drawbacks of conventional techniques, such as awkward moments, wasted time, and confusion induced by the user mistakenly believing the screen sharing mode is active on the computing device.

While features and concepts of the described techniques for controlling display of content based on screen sharing in a video conference session can be implemented in any number of different devices, systems, environments, and/or configurations, implementations of the techniques for controlling display of content based on screen sharing in a video conference session are described in the context of the following example devices, systems, and methods.

FIG. 1 illustrates an example environment 100 in which aspects of controlling display of content based on screen sharing in a video conference session can be implemented. The environment 100 includes a computing device 102, which in the illustrated example, is depicted as a wireless device, such as a smartphone, mobile phone, flip phone, etc. These examples are not to be construed as limiting, however, and the computing device 102 can be implemented in a variety of different ways and form factors, such as any type of an electronic, computing, and/or communication device, such as a computer, a laptop, a desktop computer, a tablet, a wireless device, and so forth. The computing device 102 can be implemented with various components, such as a processor system 104 and memory 106, as well as any number and combination of different components as further described with reference to the example device 900 of FIG. 9.

In implementations, the computing device 102 may be communicatively linked, either by a wired or wireless connection, to an external display screen 108 on which digital content can be displayed, as generated for display by the computing device 102. For example, a user may join or initiate a video conference session using the computing device 102, and utilize the larger sized external display screen 108 for improved viewing and interaction during the video conference session. The computing device 102 also includes a display screen 110, which may be a flat display screen or a curved display of the computing device 102.

The computing device 102 includes device applications 112, such as any type of messaging application, email application, video communication application, cellular communication application, music application, gaming application, media application, and/or any other of the many possible types of device applications. Many device applications 112 have an associated application user interface 114 that is generated and displayed for user interaction and viewing, such as on the display screen 110 of the computing device 102 and/or on the external display screen 108. Generally, an application user interface 114, or any other type of video, image, graphic, and the like is digital content that is displayable on the display screen 110 of the computing device 102 and/or on the external display screen 108.

In the example environment 100, the device applications 112 include a video conference application 116, which a user of the computing device 102 can utilize to initiate or join a video conference session 118 with at least one remote user of a remote device 120. In general, the video conference session 118 involves the communication of audio data (e.g., captured by a microphone 122 of the computing device 102) and visual data (e.g., displayed by the display screen 110 or the external display screen 108, and/or captured by a camera of the computing device 102) for rendering at the remote device 120. Additionally or alternatively, the video conference session 118 involves the communication of audio data (e.g., captured by a microphone of the remote device 120) and visual data (e.g., displayed via the remote device 120 and/or captured by a camera of the remote device 120) for rendering at the computing device 102, e.g., via audio and visual output devices of the computing device 102, such as speakers, the display screen 110, and/or the external display screen 108.

When a video conference session 118 is active, a primary video conference user interface 124 can be generated and displayed on the display screen 110 of the computing device 102 and/or on the external display screen 108. The primary video conference user interface 124, for instance, can include a window including indications (e.g., icons or video feed) of the participants to the video conference session 118, a window that includes a participant that is currently speaking, a window that includes content that is currently shared to the video conference session 118 in a screen sharing mode, one or more action elements that are selectable to initiate actions associated with the video conference application 116 (e.g., a mute/unmute button, a button to leave the video conference session 118, a button to enter/exit a screen sharing mode, etc.), and so on.

Further, more than one of the device applications 112 may be actively executing on the computing device 102, with the associated application user interfaces 114 being generated and/or displayed on the display screen 110 of the computing device 102 and/or on the external display screen 108. Notably, any of the multiple, application user interfaces 114 can be minimized, maximized, displayed over other application user interfaces 114, and/or displayed under other application user interfaces 114. The application user interface(s) 114 which are displayed on top of, or over, the other displayed application user interface(s) 114 are considered to be user interface(s) of foreground active application(s) 126. Furthermore, the application user interface(s) 114 which are displayed underneath the other displayed application user interface(s) 114 or are minimized for display are considered to be user interface(s) of background active application(s) 128. As shown in the illustrated example, for instance, the external display screen 108 includes an email user interface 130 and a word processor user interface 132 over the primary video conference user interface 124 (not shown), while a web-browser user interface (not shown) is minimized. In this example, the email application and the word processing application are foreground active applications 126, while the video conference application 116 and the web-browser application are background active applications 128.

When participating in the video conference session 118, the user may enter into an immersive mode 134 in which the primary video conference user interface 124 is removed from display on the display screens 108, 110. In one example, the user is considered to be participating in the video conference session 118 in the immersive mode 134 when the primary video conference user interface 124 is minimized. In another example, the user is considered to be participating in the video conference session 118 in the immersive mode 134 when the primary video conference user interface 124 is displayed behind or underneath other content and/or application user interface(s) 114 such that the primary video conference user interface 124 is not visible on the display screens 108, 110. An example of the immersive mode 134 is shown in the illustrated example, in which the external display screen 108 displays an email user interface 130 and a word processor user interface 132 while the video conference session 118 is active, but the primary video conference user interface 124 is removed from display on the display screen 110 and the external display screen 108.

When the video conference session 118 is active in the immersive mode 134, there may be no user interface elements and or digital content of the video conference application 116 displayed on the display screens 108, 110, as shown in the illustrated example. Additionally or alternatively, there may be secondary content of the video conference application 116 displayed on the display screens 108, 110 while the video conference session 118 is active in the immersive mode 134. Examples of the secondary content include a picture-in-picture window showing a participant of the video conference session 118 that is currently speaking, a picture-in-picture window showing content that is currently being shared in a screen sharing mode, a task bar having action elements that are selectable to initiate actions associated with the video conference application 116 (e.g., a mute/unmute button, a button to leave the video conference session 118, a button to enter/exit a screen sharing mode, etc.), and so on. In at least one example, the secondary content is displayed over a portion of the application user interface(s) 114 of the foreground active application(s) 126. Notably, the user is still considered to be in the immersive mode 134 while the secondary content of the video conference application 116 is displayed on the display screens 108, 110, as long as the primary video conference user interface 124 is removed from display on the display screens 108, 110.

While participating in the video conference session 118, the user may enter into a screen sharing mode 136 in which content displayed on the display screen 110 of the computing device 102 and/or the external display screen 108 is shared with the remote user of the remote device 120. In the screen sharing mode 136, for instance, the content currently displayed on one or more of the display screens 108, 110 is communicated to the remote device and rendered for display on the remote device 120, e.g., as displayed on the one or more display screens 108, 110. Given this, in response to input by the user to modify the displayed content that is being shared, a corresponding change is displayed on the remote device 120. Notably, any participant of the video conference session (e.g., the user of the computing device 102, or any remote user of any remote device 120) can enter into the screen sharing mode 136.

In some implementations, when the video conference session 118 is active on the computing device 102 in the screen sharing mode 136, the remote user enters the screen sharing mode 136 on the remote device 120 and causes termination of the screen sharing mode 136 initiated on the computing device 102. For example, the content displayed on the external display screen 108 ceases to be shared to participants of the video conference session 118, and instead, the content displayed on the remote device 120 is shared to participants of the video conference session 118. Due to this, the user may be wholly unaware that the content displayed on the external display screen 108 is no longer being shared in the screen sharing mode 136, particularly when the user was sharing the displayed content in the immersive mode 134. After initiating the screen sharing mode 136 on the remote device 120, the remote user can then end the screen sharing mode on the remote device 120 such that no content is being shared to the video conference session 118 using the screen sharing mode 136. While mistakenly believing that the screen sharing mode 136 is still active on the computing device 102, the user may begin addressing content displayed on the external display screen 108. In actuality, however, the displayed content is no longer being shared to the other participants of the video conference session 118. Situations like these can lead to awkward moments in the video conference session 118, wasted time, participant confusion, and the like.

To overcome these drawbacks of conventional video conferencing techniques, the computing device 102 implements a content control module 138. In accordance with the described techniques, the content control module 138 determines that a video conference session 118 is active on the computing device 102 in the screen sharing mode 136 and in the immersive mode 134. In other words, the content control module 138 determines that, while the content displayed on the external display screen 108 is shared in the screen sharing mode 136, the primary video conference user interface 124 is removed from the display screens 108, 110. Further, the content control module 138 detects that the remote user has entered the screen sharing mode 136 on the remote device 120, thereby ending the screen sharing mode 136 on the computing device 102. In response, the content control module 138 surfaces the primary video conference user interface 124 for display on the display screen 110 of the computing device 102 and/or on the external display screen 108. In this way, when the user's screen sharing session is terminated by the remote user entering the screen sharing mode 136, the content control module 138 surfaces the primary video conference user interface 124 as the foreground active application 126 as a reminder that the screen sharing mode 136 is no longer active on the computing device 102.

Further, the content control module 138 detects that the remote user has ended the screen sharing mode on the remote device 120 such that no content is currently being shared to the video conference session 118 using the screen sharing mode 136. In response, the content control module 138 displays a prompt on one or more of the display screens 108, 110 that is selectable to resume the screen sharing mode on the computing device 102. The prompt serves as a reminder that the screen sharing mode 136 is not active on the computing device 102 and enables the user to quickly resume sharing the content that was previously being shared in the screen sharing mode 136. Therefore, the described techniques alleviate the drawbacks of conventional techniques, such as awkward moments, wasted time, and confusion induced by the user mistakenly believing the screen sharing mode 136 is active on the computing device 102.

Having discussed an example environment in which the disclosed techniques can be performed, consider now some example scenarios and implementation details for implementing the disclosed techniques.

Figure 2:
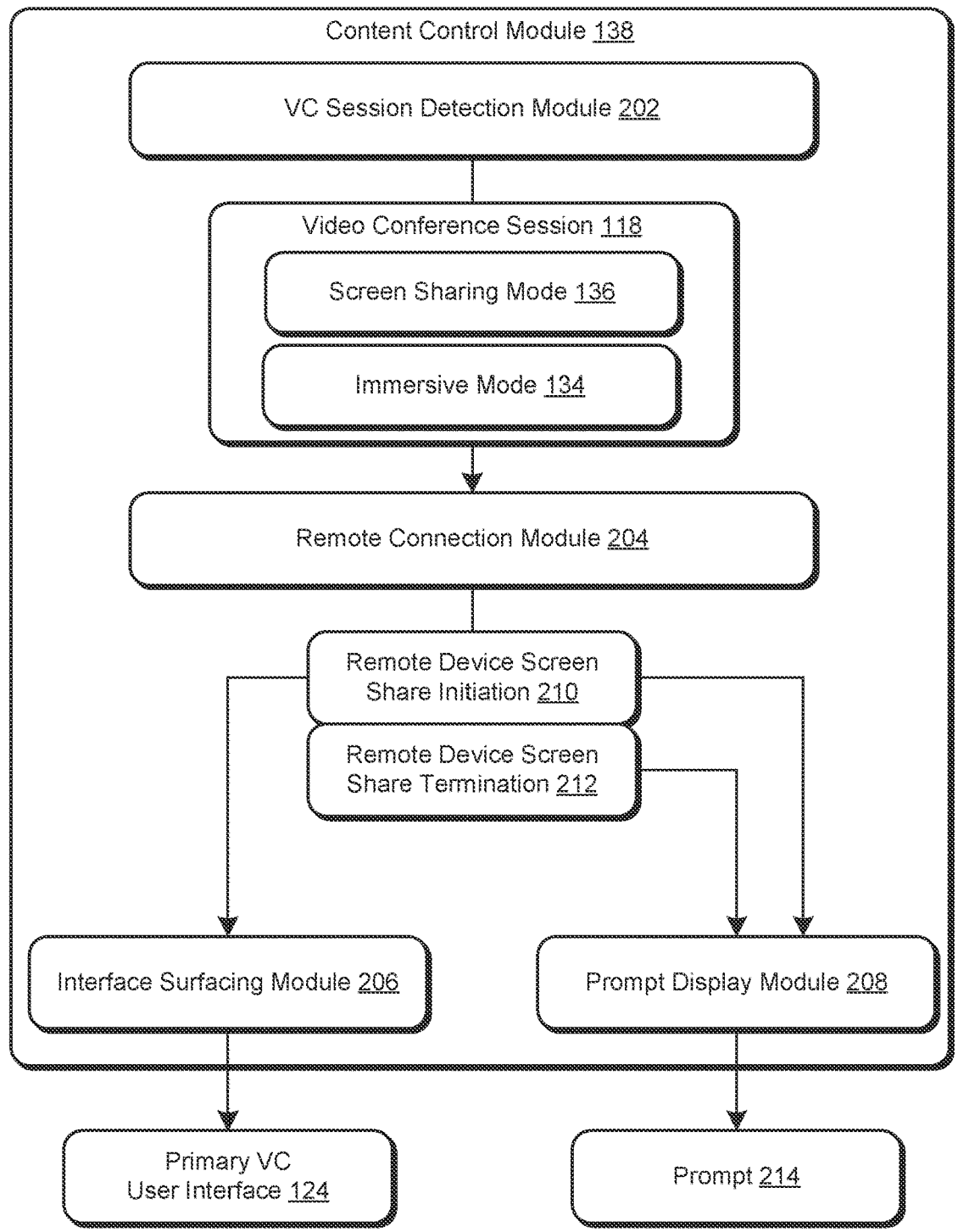
FIG. 2 depicts an example system in which aspects of controlling display of content based on screen sharing in a video conference session can be implemented.

FIG. 2 depicts an example system 200 in which aspects of controlling display of content based on screen sharing in a video conference session can be implemented. As shown, the example system 200 includes the content control module 138, which employs a video conference session detection module 202, a remote connection module 204, an interface surfacing module 206, and a prompt display module 208. The modules 138, 202, 204, 206, 208 can be implemented as separate modules that may include independent processing, memory, and/or logic components functioning as a computing and/or electronic device integrated with the computing device 102. Alternatively or in addition, the modules 138, 202, 204, 206, 208 can be implemented as software applications or modules, such as executable software instructions (e.g., computer-executable instructions) that are executable with the processor system 104 of the computing device 102 to implement the techniques and features of controlling display of content based on screen sharing in a video conference session, as described herein. As software applications or modules, the modules 138, 202, 204, 206, 208 can be stored on computer-readable storage memory, or in any other suitable memory device or electronic data storage implemented with the modules. Alternatively or in addition, the modules 138, 202, 204, 206, 208 may be implemented in firmware and/or at least partially in computer hardware. For example, at least part of the modules 138, 202, 204, 206, 208 may be executable by a computer processor, and/or at least part of the modules 138, 202, 204, 206, 208 may be implemented in logic circuitry.

In accordance with the described techniques, the video conference session detection module 202 is configured to detect that a video conference session 118 is active on the computing device 102 in the screen sharing mode 136. For example, the video conference session detection module 202 detects an active video conference session 118 in which the user of the computing device 102 is sharing content displayed on the display screen 110 of the computing device 102 and/or the external display screen 108 with the remote user connected to the video conference session 118 via the remote device 120. In some implementations, the video conference session detection module 202 additionally detects that the video conference session 118 is active in the immersive mode 134. By way of example, while the displayed content is being shared in the screen sharing mode 136, the video conference session detection module 202 determines that the primary video conference user interface 124 is removed from display on the display screens 108, 110.

Figure 3:
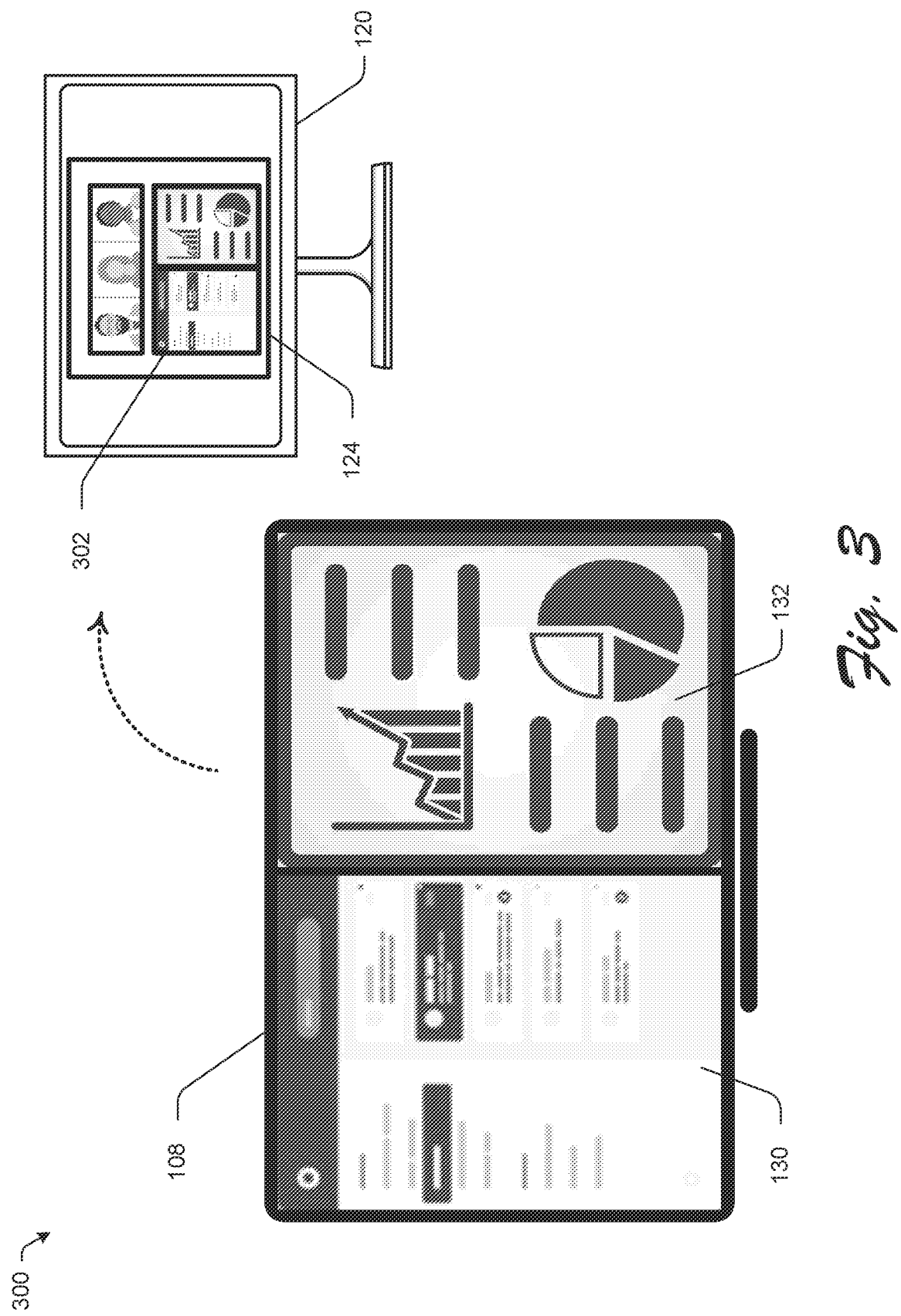
FIG. 3 depicts an example showing an active video conference session in which a user enters a screen sharing mode via a computing device.

FIG. 3 depicts an example 300 showing an active video conference session in which a user enters a screen sharing mode via a computing device. As shown, the external display screen 108 is displaying the email user interface 130 and the word processor user interface 132. Further, the content displayed on the external display screen 108 is communicated to the remote device 120 and rendered for display on the remote device 120. By way of example, the remote device 120 displays a primary video conference user interface 124 including a window 302 that displays the email user interface 130 and the word processor user interface 132, as displayed on the external display screen 108. As further shown in the example 300, the user of the computing device 102 is also participating in the video conference session 118 in the immersive mode 134 since the primary video conference user interface 124 is removed from display on the external display screen 108. Accordingly, in the illustrated example 300, the video conference session detection module 202 detects that a video conference session 118 is active on the computing device 102 in the screen sharing mode 136 and in the immersive mode 134.

Returning to FIG. 2, the remote connection module 204 receives an indication from the video conference session detection module 202 that the video conference session is active on the computing device 102 in the screen sharing mode 136 and in the immersive mode 134. Broadly, the remote connection module 204 is configured to monitor the connection of the remote device 120 to the video conference session 118. More specifically, the remote connection module 204 is configured to detect a remote device screen share initiation 210. The remote device screen share initiation 210 is an initiation of the screen sharing mode 136 via the remote device 120. As previously mentioned, the remote device screen share initiation 210 causes termination of the screen sharing mode 136 on the computing device 102, in some implementations.

An indication of the remote device screen share initiation 210 is provided to the interface surfacing module 206. Based on the video conference session 118 being active in the immersive mode 134 and in response to the remote user ending the screen sharing mode 136 initiated by the computing device 102 (e.g., by initiating the screen sharing mode 136 on the remote device 120), the interface surfacing module 206 is configured to surface the primary video conference user interface 124. By way of example, the interface surfacing module 206 displays the primary video conference user interface 124 to at least partially cover the content that was previously shared by the computing device 102 in the screen sharing mode 136. In other words, the interface surfacing module 206 makes the video conference application 116 the foreground active application 126.

Figure 4:
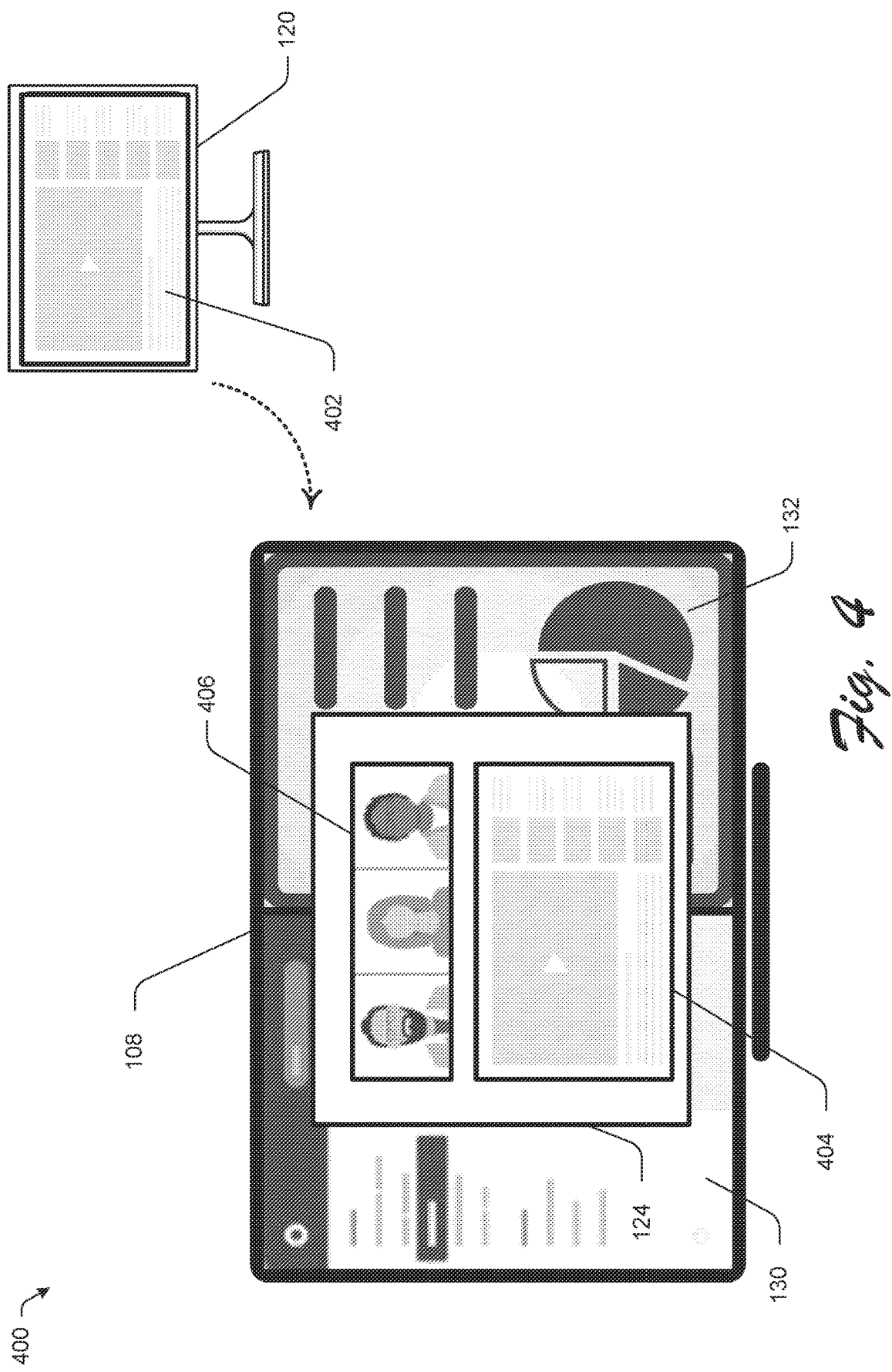
FIG. 4 depicts an example showing an active video conference session in which a remote user enters a screen sharing mode via a remote device.

FIG. 4 depicts an example 400 showing an active video conference session in which a remote user enters a screen sharing mode via a remote device. More specifically, while the user is participating in the video conference session 118 in the immersive mode 134 and in the screen sharing mode 136 to share the email user interface 130 and the word processor user interface 132 displayed on the external display screen 108 (e.g., as depicted and discussed with reference to FIG. 3), the remote user initiates the screen sharing mode 136 on the remote device 120. In this example 400, initiation of the screen sharing mode 136 on the remote device 120 causes termination of the screen sharing mode 136 initiated by the computing device 102. Therefore, the interface surfacing module 206 receives an indication of the remote device screen share initiation 210 while the video conference session 118 is active on the computing device 102 in the screen sharing mode 136 and in the immersive mode 134.

In response, the interface surfacing module 206 surfaces the primary video conference user interface 124. Indeed, as shown in the example 400, the interface surfacing module 206 displays the primary video conference user interface 124 to partially cover the email user interface 130 and the word processor user interface 132 that were previously shared by the computing device 102 in the screen sharing mode 136. In this example 400, the remote user enters the screen sharing mode 136 to share a web browser user interface 402 displayed on the remote device 120, and as such, a window 404 of the primary video conference user interface 124 displays the web browser user interface 402, as displayed on the remote device 120. Moreover, the primary video conference user interface 124 also includes a window 406 that displays indications (e.g., icons and/or video feed) of other participants of the video conference session 118.

In one or more implementations, the interface surfacing module 206 surfaces the primary video conference user interface 124 on the display screen 110 of the computing device 102 rather than or in addition to the external display screen 108. Further, in some implementations, the interface surfacing module 206 only surfaces the primary video conference user interface 124 if the immersive mode 134 is detected on the computing device 102 when the indication of the remote device screen share initiation 210 is received. This is because, if the immersive mode 134 is not detected, the primary video conference user interface 124 is already displayed on the display screen 110 or the external display screen 108. Given this, the user is likely to be notified that the screen sharing session has ended on the computing device 102, and a new screen sharing session has been initiated via the remote device 120.

In at least one alternative implementation, the interface surfacing module 206 surfaces the primary video conference user interface 124 in response to receiving an indication of the remote device screen share initiation 210 even when the immersive mode 134 is not detected. In one example, for instance, the primary video conference user interface 124 is partially displayed on at least one of the display screens 108, 110, and partially covered by an application user interface 114 of a foreground active application 126. In response to the remote device screen share initiation 210 in this example, the interface surfacing module 206 surfaces the primary video conference user interface 124 to cover the other application user interface 114 and make the video conference application 116 the foreground active application 126.

In another example, the primary video conference user interface 124 is displayed on the display screen 110 of the computing device 102 while the user is primarily interacting with content displayed on the external display screen 108. In this example, the interface surfacing module 206 detects that the user is primarily interacting with the content displayed on the external display screen 108. Further, in response to receiving the indication of the remote device screen share initiation 210, the interface surfacing module 206 surfaces the primary video conference user interface 124 on the external display screen 108. Thus, the interface surfacing module 206 in this example surfaces the primary video conference user interface 124 on the external display screen 108 despite the primary video conference user interface 124 already being displayed on the display screen 110 of the computing device 102 when the remote device screen share initiation 210 is received.

As discussed above, the application settings of the video conference application 116 dictate that the remote user can end a screen sharing session initiated via the computing device 102 by initiating a screen sharing session via the remote device 120, in some implementations. In variations, however, the application settings of the video conference application 116 dictate that the screen sharing mode 136 is to be terminated on the computing device 102 before the screen sharing mode 136 can be initiated on the remote device 120. It is to be appreciated that, when the video conference application 116 is configured in this way, the interface surfacing module 206 is still configured to surface the primary video conference user interface 124 in accordance with the techniques described herein for controlling display of content based on screen sharing in a video conference session.

By way of example, after detecting that that the video conference session 118 is active on the computing device 102 in the screen sharing mode 136, the video conference session detection module 202 detects that the user ends the screen sharing mode 136 on the computing device 102. Subsequently, while the video conference session remains active on the computing device 102 and in the immersive mode 134, the remote connection module 204 detects the remote device screen share initiation 210. Based on the user participating in the video conference session 118 in the immersive mode 134 and in response to the remote user entering the screen sharing mode 136 on the remote device 120, the interface surfacing module 206 surfaces the primary video conference user interface 124, as discussed above. Accordingly, the primary video conference user interface 124 can be surfaced in many ways without departing from the described techniques for controlling display of content based on screen sharing in a video conference session.

Returning to FIG. 2, the remote connection module 204 is additionally configured to detect a remote device screen share termination 212. The remote device screen share termination 212 is a termination of the screen sharing mode 136 via the remote device 120, e.g., to no longer share content displayed on the remote device 120 to the video conference session 118. Thus, after the remote device screen share termination 212 is detected, there are no participants of the video conference session 118 sharing displayed content to other participants of the video conference session 118 using the screen sharing mode 136. An indication of the remote device screen share initiation 210 and an indication of the subsequent remote device screen share termination 212 are provided to the prompt display module 208. In response to receiving the indication of the remote device screen share termination 212, the prompt display module 208 is configured to display a prompt 214 on the display screen 110 of the computing device 102 and/or the external display screen 108 that is selectable to resume the screen sharing mode 136 on the computing device 102.

Figure 5:
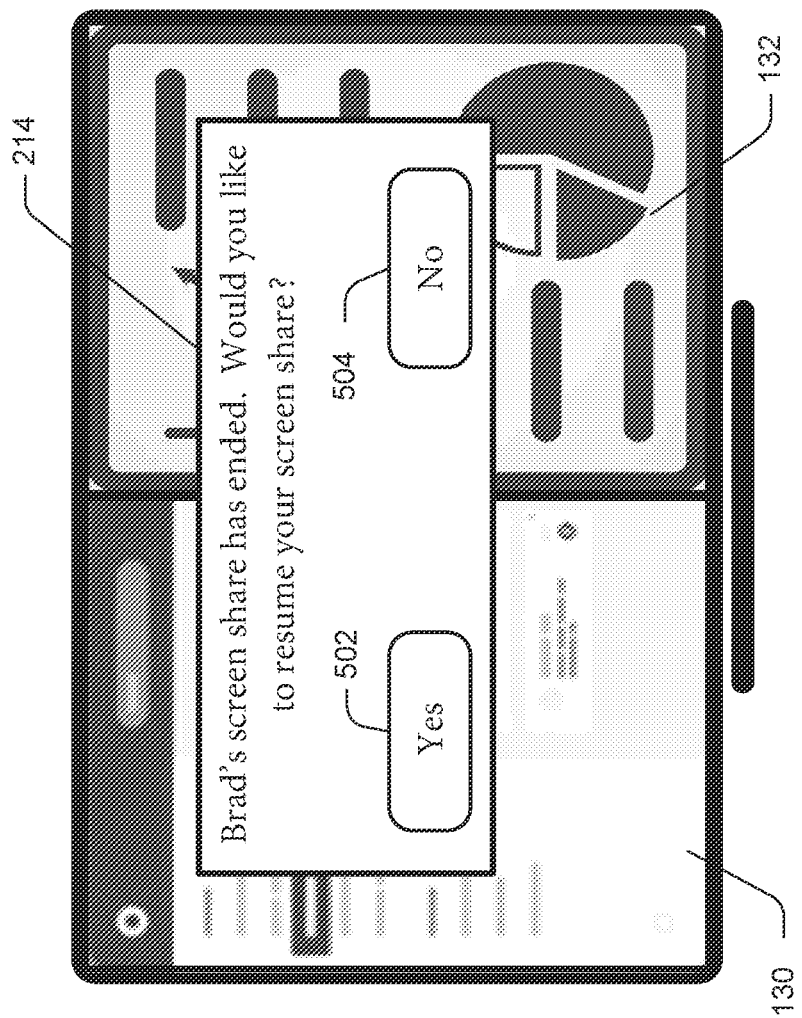
FIG. 5 depicts an example showing an active video conference session in which a user is prompted to resume screen sharing via the computing device.

FIG. 5 depicts an example 500 showing an active video conference session in which a user is prompted to resume screen sharing on the computing device. More specifically, after the screen share on the remote device 120 is initiated and the screen share is consequently terminated on the computing device 102 (e.g., as depicted and discussed with reference to FIG. 4), the remote user ends the screen sharing mode 136 on the remote device 120. As a result, there is no content being shared to the video conference session 118 using the screen sharing mode 136. Accordingly, the prompt display module 208 receives an indication of the remote device screen share initiation 210 and an indication of the subsequent remote device screen share termination 212. In other words, the prompt display module 208 receives indication that the user was previously sharing content displayed on the external display screen 108 with other participants of the video conference session 118, the screen sharing mode 136 was terminated on the computing device 102 by the remote user entering the screen sharing mode 136 on the remote device 120, and the screen sharing mode 136 has since ended on the remote device 120 such that no content is being shared to the video conference session 118 using the screen sharing mode 136.

Given this, the prompt display module 208 displays the prompt 214 on the external display screen 108. As shown, the prompt 214 includes a notification that the screen share has ended on the remote device 120 and a user interface element 502 that is selectable to resume the screen sharing mode 136 on the computing device 102. In response to receiving a selection of the user interface element 502, the content control module 138 initiates the screen sharing mode 136 to share the content that was shared by the computing device 102 in the screen sharing mode 136 prior to the screen sharing mode 136 being terminated. In the illustrated example 500, for instance, the email user interface 130 and the word processor user interface 132 were previously shared before the screen sharing mode 136 was terminated on the computing device 102. Therefore, in response to receiving a selection of the user interface element 502, the content control module 138 resumes sharing the email user interface 130 and the word processor user interface 132 in the screen sharing mode 136. Additionally, the prompt 214 includes a user interface element 504 that is selectable to decline resuming the screen sharing mode 136 on the computing device 102.

In one or more implementations, the prompt display module 208 is configured to display the prompt 214 in response to determining that the user is addressing the content that was previously shared in the screen sharing mode 136. By way of example, the video conference application 116 can be equipped with real-time speech to text functionality to convert audio data in the form of speech (e.g., as communicated by the user and captured by the microphone 122) to text for purposes of caption and transcript generation. To determine that the user is addressing the content that was previously shared in the screen sharing mode 136, the prompt display module 208 receives the converted text and compares the converted text to the text of the content that was previously shared in the screen sharing mode 136. In the illustrated example 500, for instance, the prompt display module 208 compares the converted text to the text of the email user interface 130 and the word processor user interface 132. If at least a portion of the converted text matches the text of the email user interface 130 and/or the word processor user interface 132, then it is determined that the user is addressing the content that was previously shared in the screen sharing mode 136. Given this, the prompt display module 208 displays the prompt 214 in response to the remote device screen share termination 212 and the determination that the user is addressing the content that was previously shared in the screen sharing mode 136.

Additionally or alternatively, the prompt display module 208 is configured to display the prompt 214 in response to determining that the user is addressing content that is currently displayed on the display screen 110 of the computing device 102 or the external display screen 108. By way of example, the prompt display module 208 receives the converted text and compares the converted text to the text of application user interface(s) 114 of the foreground active application(s) 126. Based on the comparison, the prompt display module 208 determines that the user is addressing the content of the foreground active application(s) 126, using the above-described techniques. In this implementation, the prompt display module 208 displays the prompt 214 in response to the remote device screen share termination 212 and the determination that the user is addressing the content that is currently displayed on the display screens 108, 110.

Moreover, the prompt display module 208 can initiate to display the prompt 214 responsive to determining that the user is addressing the previously shared and/or the currently displayed content without monitoring the connection of the remote device 120 to the video conference session 118. By way of example, the video conference session detection module 202 can determine that the screen sharing mode 136 has ended on the computing device 102, e.g., by the user selecting an action element of the primary video conference user interface 124 to end the screen sharing mode 136 on the computing device 102. Subsequently, the prompt display module 208 determines that the user is addressing the content that was previously shared in the screen sharing mode 136 and/or the content that is currently displayed on the display screens 108, 110, using the above-described techniques. Given this, the prompt display module 208 displays the prompt 214 in response to the user addressing the currently displayed content and/or the previously shared content, regardless of whether the remote user entered the screen sharing mode 136 on the remote device 120.

Furthermore, the prompt display module 208 can initiate to display the prompt 214 responsive to determining that the user is addressing the currently displayed content without the user having previously entered the screen sharing mode 136 on the computing device 102 during the video conference session 118. By way of example, the video conference session detection module 202 can determine that a video conference session 118 is active on the computing device 102 in which the user has not yet initiated the screen sharing mode 136 on the computing device. Further, the prompt display module 208 determines that the user is addressing the content that is currently displayed on the display screens 108, 110, using the above-described techniques. Given this, the prompt display module 208 displays the prompt 214 in response to the user addressing the currently displayed content. In this implementation, the prompt is selectable to initiate the screen sharing mode 136 on the computing device for the first time during the video conference session 118 rather than resume the screen sharing mode 136.

In at least one variation, the prompt display module 208 is configured to display the prompt 214 based on the screen sharing mode 136 being inactive in the video conference session 118 when the user is determined to be addressing the previously shared and/or the currently displayed content. By way of example, the prompt display module 208 determines that the user is addressing the content that was previously shared in the screen sharing mode 136 and/or the content that is currently displayed on the display screens 108, 110, using the above-described techniques. In response, the video conference session detection module 202 determines that the screen sharing mode 136 is inactive on the computing device 102, and the remote connection module 204 determines that the screen sharing mode 136 is inactive on the one or more remote devices 120, i.e., no participants are sharing displayed content to the video conference session 118 using the screen sharing mode 136. Given this, the prompt display module 208 displays the prompt 214 in response to the user addressing the currently displayed content and/or the previously shared content and the screen sharing mode 136 being inactive in the video conference session 118.

In one or more implementations, the prompt display module 208 is configured to display the prompt 214 based on the user participating in the video conference session 118 in the immersive mode 134 when the remote device screen share termination 212 is detected. By way of example, after the primary video conference user interface 124 is surfaced on one or more of the display screens 108, 110, the user provides input to re-enter the immersive mode 134, e.g., by minimizing the primary video conference user interface 124 or by displaying additional application user interface(s) 114 over the primary video conference user interface 124. In accordance with this implementation, the prompt 214 is displayed in response to the remote device screen share termination 212 and a detection of the immersive mode 134 when the remote device screen share termination 212 is detected.

In implementations, the prompt display module 208 is configured to display the prompt 214 in response to determining that a presentation of the content that was previously shared in the screen sharing mode 136 is incomplete. To do so, the video conference session detection module 202 determines that at least a portion of the content being shared was not rendered for display while the screen sharing mode 136 was active. Consider an example in which the user is sharing the word processor user interface 132 displayed on the external display screen 108 to the video conference session 118. In this example, the word processor user interface 132 includes a document that is seven pages long. Given this, the video conference session detection module 202 determines whether the entire seven pages were rendered for display on the external display screen 108 while the screen sharing mode 136 was active on the computing device 102. If less than all seven pages were rendered, the video conference session detection module 202 determines that a presentation of the word processor user interface 132 is incomplete. Further, the video conference session detection module 202 provides an indication of the incomplete presentation of the word processor user interface 132 to the prompt display module 208. Given this, the prompt display module 208 displays the prompt 214 in response to the remote device screen share termination 212 and the indication that the presentation of the content is incomplete.

In various implementations, the prompt display module 208 is configured to display the prompt 214 in response to determining that the screen sharing session initiated on the remote device 120 is shorter than a threshold amount of time. By way of example, the prompt display module 208 determines a length of time associated with the screen sharing session on the remote device 120 based on a time difference between when the remote device screen share initiation 210 is received and when the remote device screen share termination 212 is received. Given this, the prompt display module 208 displays the prompt 214 in response to the remote device screen share termination 212 and the determination that the length of time associated with the screen sharing session on the remote device 120 is shorter than the threshold amount of time. Notably, the prompt display module 208 considers the threshold amount of time when displaying the prompt 214 because the user is likely to become aware that he or she is no longer sharing content in the screen sharing mode 136 if the user's screen sharing session has been terminated for a longer period of time.

As previously noted, the application settings of the video conference application 116 dictate that the screen sharing mode 136 is to be terminated on the computing device 102 before the screen sharing mode 136 can be initiated on the remote device 120, in some implementations. It is to be appreciated that, when the video conference application 116 is configured in this way, the prompt display module 208 is still configured to display the prompt 214 in accordance with the described techniques for controlling display of content based on screen sharing in a video conference session. By way of example, after detecting that that the video conference session 118 is active on the computing device 102 in the screen sharing mode 136, the video conference session detection module 202 detects that the user ends the screen sharing mode 136 on the computing device 102. Subsequently, the remote connection module 204 detects the remote device screen share initiation 210 followed by the remote device screen share termination 212. In response to receiving an indication of the remote device screen share termination 212, the prompt display module 208 displays the prompt 214 on the display screen 110 of the computing device 102 and/or the external display screen 108 that is selectable to resume the screen sharing mode 136 on the computing device 102, as discussed above.

Notably, the prompt display module 208 can initiate to display the prompt 214 in response to receiving an indication of the remote device screen share termination 212 without considering the above-described additional determinations (e.g., the determination that the user is addressing the previously shared and/or currently displayed content, the determination that the screen sharing mode 136 is inactive in the video conference session 118 when the user is determined to be addressing the previously shared and/or the currently displayed content, the detection of the immersive mode 134 on the computing device 102 when the remote device screen share termination 212 is detected, the determination that the presentation is incomplete when the screen sharing mode 136 is terminated on the computing device 102, and the determination that the length of time associated with the screen sharing session on the remote device 120 is shorter than the threshold amount of time). Additionally or alternatively, the prompt display module 208 can initiate the prompt 214 in response to receiving an indication of the remote device screen share termination 212, and any one or any combination of the above-described additional determinations. Accordingly, the prompt 214 can be displayed in many ways without departing from the described techniques for controlling display of content based on screen sharing in a video conference session.

Figure 6:
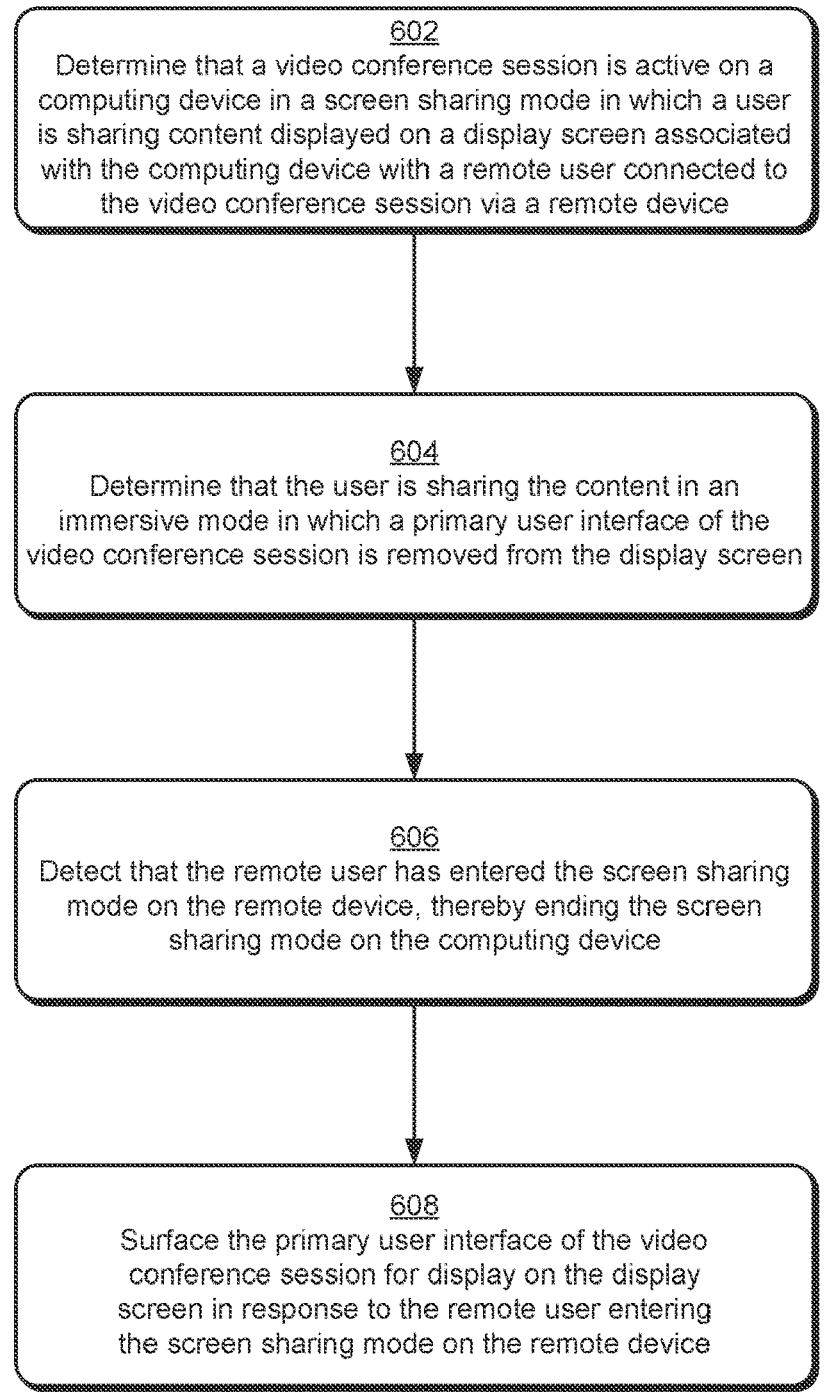
FIG. 6 depicts an example procedure to surface a primary user interface of a video conference session based on a remote user entering a screen sharing mode via a remote device.

FIG. 6 depicts an example procedure 600 to surface a primary user interface of a video conference session based on a remote user entering a screen sharing mode via a remote device. The order in which the method is described is not intended to be construed as a limitation, and any number or combination of the described method operations can be performed in any order to perform a method, or an alternate method.

A video conference session is determined to be active on a computing device in a screen sharing mode in which a user is sharing content displayed on a display screen associated with the computing device with a remote user connected to the video conference session via a remote device (block 602). For example, the video conference session detection module 202 detects an active video conference session 118 on the computing device 102. Further, the video conference session detection module 202 determines that the user has entered a screen sharing mode 136 in which the user is sharing content displayed on the display screen 110 of the computing device 102 and/or the external display screen 108 to other participants of the video conference session 118. The other participants include at least one remote user connected to the video conference session via the remote device 120.

The user is determined to be sharing the content in an immersive mode in which a primary user interface of the video conference session is removed from the display screen of the computing device (block 604). For example, the video conference session detection module 202 additionally determines that the user is sharing the content in the immersive mode 134, in which the user is participating in the video conference session 118 but the primary video conference user interface 124 is removed from display on the display screens 108, 110.

The remote user is detected as having entered the screen sharing mode on the remote device, thereby ending the screen sharing mode on the computing device (block 606). By way of example, the application settings of the video conference application 116 dictate that the remote user can end a screen sharing session initiated via the computing device 102 by initiating a screen sharing session via the remote device 120, in some implementations. Thus, the remote connection module 204 detects the remote device screen share initiation 210 which, in turn, causes termination of the screen sharing session initiated by the computing device 102.

The primary user interface of the video conference session is surfaced for display on the display screen in response to the remote user entering the screen sharing mode on the remote device (block 608). By way of example, the remote connection module 204 provides the remote device screen share initiation 210 to the interface surfacing module 206. The remote device screen share initiation 210 indicates that the remote user has ended the screen sharing mode 136 on the computing device by entering the screen sharing mode 136 on the remote device 120. Accordingly, the interface surfacing module 206 surfaces the primary video conference user interface 124 responsive to receiving the remote device screen share initiation 210. In at least one implementation, the primary video conference user interface 124 is surfaced based on the immersive mode 134 being detected when the remote device screen share initiation 210 is received.

Figure 7:
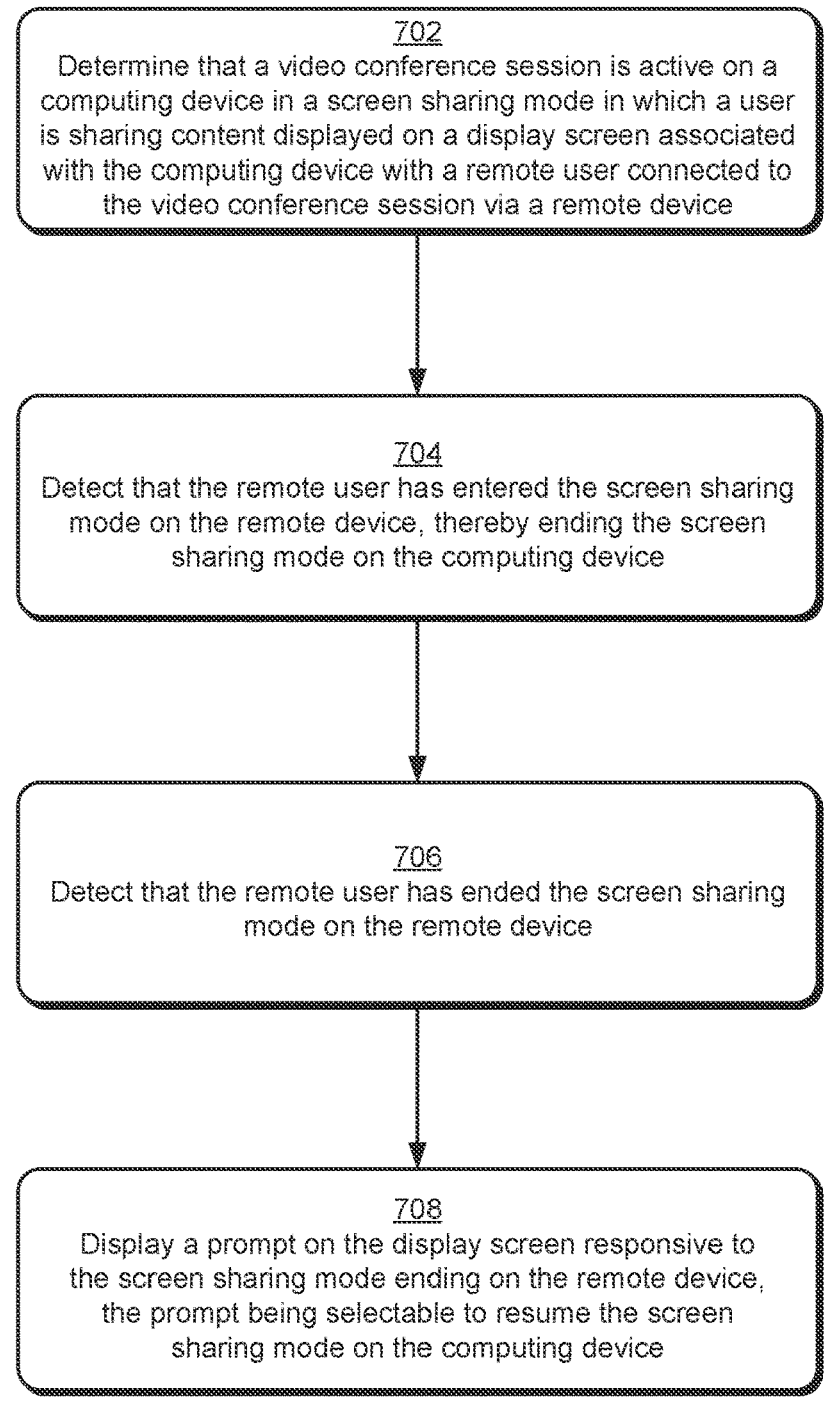
FIG. 7 depicts an example procedure to prompt a user to resume screen sharing on a computing device based on initiation of a screen sharing session by a remote user of a remote device.

FIG. 7 depicts an example procedure 700 to prompt a user to resume screen sharing on a computing device based on initiation of a screen sharing session by a remote user of a remote device. The order in which the method is described is not intended to be construed as a limitation, and any number or combination of the described method operations can be performed in any order to perform a method, or an alternate method.

A video conference session is determined to be active on a computing device in a screen sharing mode in which a user is sharing content displayed on a display screen associated with the computing device with a remote user connected to the video conference session via a remote device (block 702). For example, the video conference session detection module 202 detects an active video conference session 118 on the computing device 102. Further, the video conference session detection module 202 determines that the user has entered a screen sharing mode 136 in which the user is sharing content displayed on the display screen 110 of the computing device 102 and/or the external display screen 108 to other participants of the video conference session 118. The other participants include at least one remote user connected to the video conference session via the remote device 120.

The remote user is detected as having entered the screen sharing mode on the remote device, thereby ending the screen sharing mode on the computing device (block 704). By way of example, the application settings of the video conference application 116 dictate that the remote user can end a screen sharing session initiated via the computing device 102 by initiating a screen sharing session via the remote device 120. Thus, the remote connection module 204 detects the remote device screen share initiation 210 which, in turn, causes termination of the screen sharing session initiated by the computing device 102.

The remote user is detected as having ended the screen sharing mode on the remote device (block 706). By way of example, the remote connection module detects the remote device screen share termination 212, which is a termination of the screen sharing mode 136 on the remote device 120, e.g., to no longer share content displayed on the remote device 120 to the video conference session 118. Thus, after the remote device screen share termination 212, there are no participants of the video conference session 118 sharing content to other participants of the video conference session 118 using the screen sharing mode 136.

A prompt is displayed on the display screen responsive to the screen sharing mode ending on the remote device, the prompt being selectable to resume the screen sharing mode on the computing device (block 708). By way of example, the prompt display module 208 receives the remote device screen share initiation 210 and the subsequent remote device screen share termination 212. This indicates to the prompt display module 208 that the user was previously sharing content displayed on the external display screen 108 with other participants of the video conference session 118, the screen sharing mode 136 was terminated on the computing device 102 by the remote user entering the screen sharing mode 136 on the remote device 120, and the screen sharing mode 136 has ended on the remote device 120 such that no content is being shared to the video conference session 118 using the screen sharing mode 136. Thus, in response to receiving the remote device screen share termination 212, the prompt display module 208 displays the prompt 214 on the display screen 110 and/or the external display screen 108. Notably, the prompt 214 is selectable to resume sharing the content that was shared by the computing device 102 in the screen sharing mode 136 prior to the screen sharing mode 136 being terminated.

Figure 8:
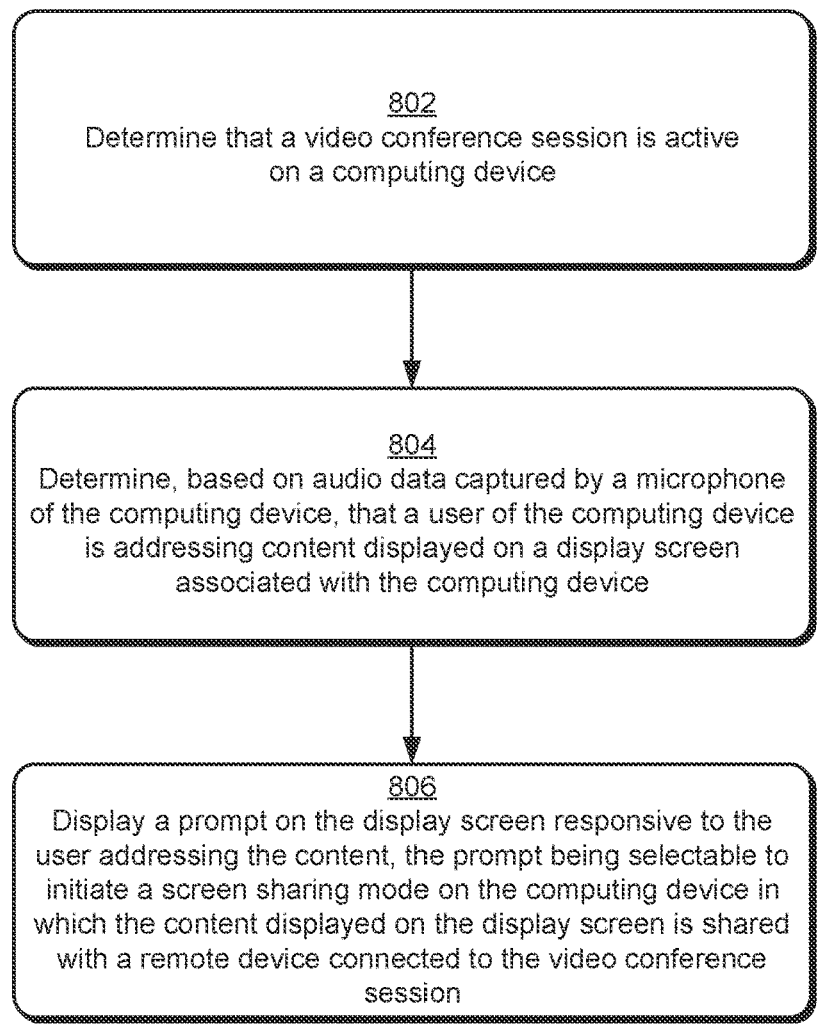
FIG. 8 depicts an example procedure to prompt a user to initiate screen sharing on a computing device based on the user addressing content that was previously shared in a screen sharing mode.

FIG. 8 depicts an example procedure 800 to prompt a user to initiate screen sharing on a computing device based on the user addressing content that was previously shared in a screen sharing mode. The order in which the method is described is not intended to be construed as a limitation, and any number or combination of the described method operations can be performed in any order to perform a method, or an alternate method.

A video conference session is determined to be active on a computing device (block 802). For example, the video conference session detection module 202 detects an active video conference session 118 on the computing device 102. In the active video conference session 118, a user is connected to the video conference session 118 via the computing device 102, and at least one remote user is connected to the video conference session 118 via at least one remote device 120.

A user of the computing device is determined to be addressing content displayed on a display screen associated with the computing device based on audio data captured by a microphone of the computing device (block 804). By way of example, the video conference application 116 is equipped with real-time speech to text functionality to convert audio data (e.g., in the form of speech communicated by the user and captured by the microphone 122) to text. The prompt display module 208 compares the converted text to the text of the content displayed on the display screen 110 and/or the external display screen 108. The prompt display module 208 then determines, based on the comparison, that the user is addressing the displayed content.

A prompt is displayed on the display screen responsive to the user addressing the content, the prompt being selectable to initiate a screen sharing mode on the computing device in which the content displayed on the display screen is shared with a remote device connected to the video conference session (block 806). By way of example, the prompt display module 208 displays the prompt 214 in response to determining that the user is addressing the content displayed on the display screen 110 and/or the external display screen 108. The prompt 214 is selectable to initiate the screen sharing mode 136 to share the displayed content that the user is determined to be addressing with the remote user connected to the video conference session 118 via the remote device 120. Notably, in the example procedure 800, the prompt 214 is displayed regardless of whether the user previously entered the screen sharing mode 136 on the computing device 102 during the video conference session 118, and regardless of whether the remote user entered the screen sharing mode 136 on the remote device 120.

Figure 9:
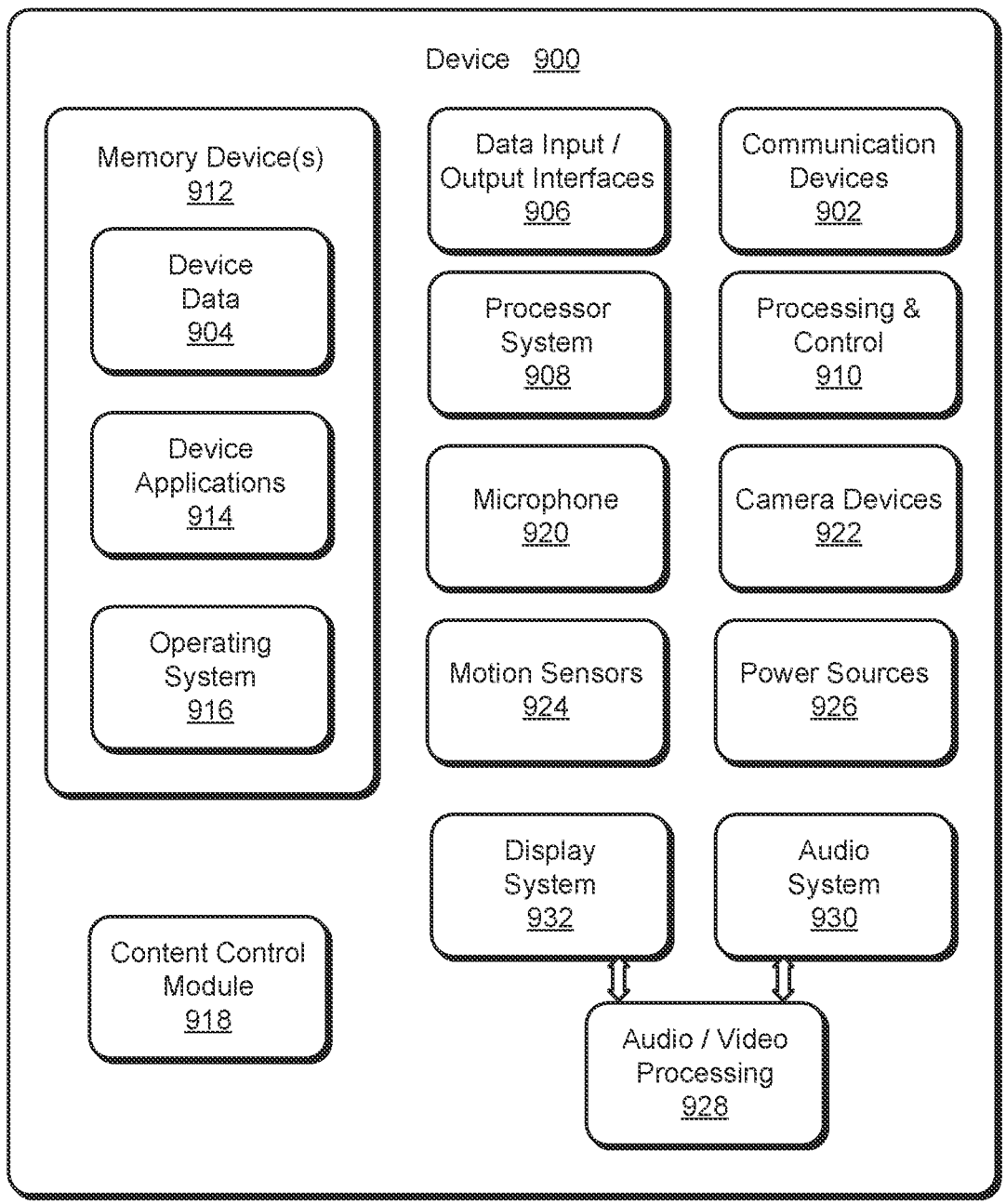
FIG. 9 illustrates various components of an example device that can implement aspects of controlling display of content based on screen sharing in a video conference session.

FIG. 9 illustrates various components of an example device 900, which can implement aspects of the techniques and features for controlling display of content based on screen sharing in a video conference session, as described herein. The example device 900 can be implemented as any of the devices described with reference to the previous FIGS. 1-9, such as any type of a wireless device, mobile device, mobile phone, flip phone, client device, companion device, paired device, display device, tablet, computing, communication, entertainment, gaming, media playback, and/or any other type of computing and/or electronic device. For example, the computing device 102 described with reference to FIGS. 1-8 may be implemented as the example device 900.

The example device 900 can include various, different communication devices 902 that enable wired and/or wireless communication of device data 904 with other devices. The device data 904 can include any of the various devices' data and content that is generated, processed, determined, received, stored, and/or communicated from one computing device to another. Generally, the device data 904 can include any form of audio, video, image, graphics, and/or electronic data that is generated by applications executing on a device. The communication devices 902 can also include transceivers for cellular phone communication and/or for any type of network data communication.

The example device 900 can also include various, different types of data input/output (I/O) interfaces 906, such as data network interfaces that provide connection and/or communication links between the devices, data networks, and other devices. The I/O interfaces 906 can be used to couple the device to any type of components, peripherals, and/or accessory devices, such as a computer input device that may be integrated with the example device 900. The I/O interfaces 906 may also include data input ports via which any type of data, information, media content, communications, messages, and/or inputs can be received, such as user inputs to the device, as well as any type of audio, video, image, graphics, and/or electronic data received from any content and/or data source.

The example device 900 includes a processor system 908 of one or more processors (e.g., any of microprocessors, controllers, and the like) and/or a processor and memory system implemented as a system-on-chip (SoC) that processes computer-executable instructions. The processor system 908 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 910. The example device 900 may also include any type of a system bus or other data and command transfer system that couples the various components within the device. A system bus can include any one or combination of different bus structures and architectures, as well as control and data lines.

The example device 900 also includes memory and/or memory devices 912 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 912 include volatile memory and non-volatile memory, fixed and removable media devices, and any suitable memory device or electronic data storage that maintains data for computing device access. The memory devices 912 can include various implementations of random-access memory (RAM), read-only memory (ROM), flash memory, and other types of storage media in various memory device configurations. The example device 900 may also include a mass storage media device.

The memory devices 912 (e.g., as computer-readable storage memory) provide data storage mechanisms, such as to store the device data 904, other types of information and/or electronic data, and various device applications 914 (e.g., software applications and/or modules). For example, an operating system 916 can be maintained as software instructions with a memory device 912 and executed by the processor system 908 as a software application. The device applications 914 may also include a device manager, such as any form of a control application, software application, signal-processing and control module, code that is specific to a particular device, a hardware abstraction layer for a particular device, and so on.

In this example, the device 900 includes a content control module 918 that implement various aspects of the described features and techniques for controlling display of content based on screen sharing in a video conference session. The content control module 918 can be implemented with hardware components and/or in software as one of the device applications 914, such as when the example device 900 is implemented as the computing device 102 as described with reference to FIGS. 1-8. Examples of the content control module 918 include the content control module 138 that is implemented by the computing device 102, such as implemented as software application(s) and/or as hardware components of the computing device 102. In implementations, the content control module 918 may include independent processing, memory, and logic components as a computing and/or electronic device integrated with the example device 900.

The example device 900 can also include a microphone 920 and/or camera devices 922, as well as motion sensors 924, such as may be implemented as components of an inertial measurement unit (IMU). The motion sensors 924 can be implemented with various sensors, such as a gyroscope, an accelerometer, and/or other types of motion sensors to sense motion of the device 900. The motion sensors 924 can generate sensor data vectors having three-dimensional parameters (e.g., rotational vectors in x, y, and z-axis coordinates) indicating location, position, acceleration, rotational speed, and/or orientation of the device. The example device 900 can also include one or more power sources 926, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 900 can also include an audio and/or video processing system 928 that generates audio data for an audio system 930 and/or generates display data for a display system 932. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 900. Alternatively, the audio system and/or the display system are external, peripheral components to the example device.

As used herein, including in the claims, "or" as used in a list of items (e.g., a list of items prefaced by a phrase such as "at least one of" or "one or more of" or "based at least in part on") indicates an inclusive list such that, a list of at least one of A, B, or C means A or B or C or AB or AC or BC or ABC (i.e., A and B and C). Further, as used herein, the phrase "based on" shall not be construed as a reference to a closed set of conditions. For example, an operation or determination described as "based on condition A" may be based on both a condition A and a condition B without departing from the scope of the present disclosure, and the phrase "based on" shall be construed in the same manner as the phrase "based at least in part on."

Although implementations for controlling display of content based on screen sharing in a video conference session have been described in language specific to features and/or methods, the appended claims are not necessarily limited to the specific features or methods described. Rather, the specific features and methods are disclosed as example implementations for controlling display of content based on screen sharing in a video conference session, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method, comprising determining that a video conference session is active on a computing device in a screen sharing mode in which a user is sharing content displayed on a display screen associated with the computing device with a remote user connected to the video conference session via a remote device; detecting that the remote user has entered the screen sharing mode on the remote device, thereby ending the screen sharing mode on the computing device; detecting that the remote user has ended the screen sharing mode on the remote device; and displaying a prompt on the display screen responsive to the screen sharing mode ending on the remote device, the prompt being selectable to resume the screen sharing mode on the computing device.

In some aspects, the techniques described herein relate to a method, wherein the display screen includes at least one of an integrated display screen of the computing device; or an external display screen to which the computing device is communicatively linked.

In some aspects, the techniques described herein relate to a method, wherein determining that the video conference session is active on the computing device in the screen sharing mode includes determining that the user is sharing the content displayed on the display screen in an immersive mode in which a primary user interface of the video conference session is removed from the display screen.

In some aspects, the techniques described herein relate to a method, further comprising surfacing the primary user interface of the video conference session for display on the display screen in response to the remote user entering the screen sharing mode on the remote device.

In some aspects, the techniques described herein relate to a method, wherein surfacing the primary user interface of the video conference session includes displaying the primary user interface to at least partially cover the content that was previously shared in the screen sharing mode.

In some aspects, the techniques described herein relate to a method, further comprising detecting, after surfacing the primary user interface of the video conference session, that the primary user interface is removed from display on the display screen, and wherein the prompt is displayed on the display screen based on the primary user interface being removed from display on the display screen.

In some aspects, the techniques described herein relate to a method, further comprising determining that a presentation of the content is incomplete when the screen sharing mode is ended on the computing device, and wherein the prompt is displayed on the display screen based on the presentation being incomplete when the screen sharing mode is ended on the computing device.

In some aspects, the techniques described herein relate to a method, wherein determining that the presentation of the content is incomplete includes determining that at least a portion of the content being shared was not rendered for display on the display screen while the screen sharing mode was active on the computing device.

In some aspects, the techniques described herein relate to a method, further comprising detecting, based on audio data captured by a microphone of the computing device and before the screen sharing mode is resumed on the computing device, that the user is addressing the content that was previously shared in the screen sharing mode, and wherein the prompt is displayed on the display screen of the computing device responsive to the user addressing the content that was previously shared.

In some aspects, the techniques described herein relate to a computing device, comprising one or more display screens; a microphone; and a content control module, implemented at least partially in hardware of the computing device, to determine that a video conference session is active on the computing device; determine, based on audio data captured by the microphone, that a user of the computing device is addressing content displayed on the one or more display screens; and display a prompt on the one or more display screens responsive to the user addressing the content, the prompt being selectable to initiate a screen sharing mode on the computing device in which the content displayed on the one or more display screens is shared with a remote device connected to the video conference session.

In some aspects, the techniques described herein relate to a computing device, wherein the one or more display screens include at least one of: an integrated display screen of the computing device; or an external display screen to which the computing device is communicatively linked.

In some aspects, the techniques described herein relate to a computing device, wherein the content control module is configured to determine that the screen sharing mode is inactive in the video conference session; and display the prompt on the one or more display screens based on the screen sharing mode being inactive.

In some aspects, the techniques described herein relate to a computing device, wherein the content control module is configured to receive user input selecting the prompt, the user input effective to initiate the screen sharing mode on the computing device.

In some aspects, the techniques described herein relate to a computing device, wherein the content control module is configured to detect, after the screen sharing mode is initiated on the computing device, initiation of the screen sharing mode on the remote device, the initiation of the screen sharing mode on the remote device causing termination of the screen sharing mode on the computing device; and surface a primary user interface of the video conference session in response to the initiation of the screen sharing mode on the remote device.

In some aspects, the techniques described herein relate to a computing device, wherein the content control module is configured to detect termination of the screen sharing mode on the remote device; and display an additional prompt on the one or more display screens responsive to the termination of the screen sharing mode on the remote device, the additional prompt being selectable to resume the screen sharing mode on the computing device.

In some aspects, the techniques described herein relate to a non-transitory computer-readable medium storing instructions, which when executed by a processor, cause the processor to perform operations comprising determining that a video conference session is active on a computing device in a screen sharing mode in which a user is sharing content displayed on a display screen associated with the computing device with a remote user connected to the video conference session via a remote device; determining that the user is sharing the content in an immersive mode in which a primary user interface of the video conference session is removed from the display screen; detecting that the remote user has entered the screen sharing mode on the remote device, thereby ending the screen sharing mode on the computing device; and surfacing the primary user interface of the video conference session for display on the display screen in response to the remote user entering the screen sharing mode on the remote device.

In some aspects, the techniques described herein relate to a non-transitory computer-readable medium, the operations further comprising detecting that the remote user has ended the screen sharing mode on the remote device; and displaying a prompt on the display screen of the computing device responsive to the screen sharing mode ending on the remote device, the prompt being selectable to resume the screen sharing mode on the computing device.

In some aspects, the techniques described herein relate to a non-transitory computer-readable medium, the operations further comprising detecting, after the primary user interface is surfaced, that the primary user interface is removed from display on the display screen; and displaying the prompt on the display screen based on the primary user interface of the video conference session being removed from display on the display screen.

In some aspects, the techniques described herein relate to a non-transitory computer-readable medium, the operations further comprising determining that a presentation of the content is incomplete when the screen sharing mode is ended on the computing device; and displaying the prompt on the display screen based on the presentation being incomplete when the screen sharing mode is ended on the computing device.

In some aspects, the techniques described herein relate to a non-transitory computer-readable medium, wherein surfacing the primary user interface of the video conference session includes displaying the primary user interface to at least partially cover the content that was previously shared in the screen sharing mode.

The invention claimed is:

1. A method, comprising:
   determining that a video conference session is active on a computing device in a screen sharing mode in which a user is sharing content displayed on a display screen associated with the computing device with a remote user connected to the video conference session via a remote device, wherein the determining includes determining that the user is sharing the content displayed on the display screen in an immersive mode in which a primary user interface of the video conference session is removed from the display screen;
   detecting that the remote user has entered the screen sharing mode on the remote device, thereby ending the screen sharing mode on the computing device;
   detecting that the remote user has ended the screen sharing mode on the remote device; and
   displaying a prompt on the display screen that is selectable to resume the screen sharing mode on the computing device responsive to the screen sharing mode ending on the remote device, the prompt being displayed based on the screen sharing mode having ended on the remote device while the immersive mode was active on the computing device.

2. The method of claim 1, wherein the display screen includes at least one of:
   an integrated display screen of the computing device; or
   an external display screen to which the computing device is communicatively linked.

3. The method of claim 1, further comprising surfacing the primary user interface of the video conference session for display on the display screen in response to the remote user entering the screen sharing mode on the remote device.

4. The method of claim 3, wherein surfacing the primary user interface of the video conference session includes displaying the primary user interface to at least partially cover the content that was previously shared in the screen sharing mode.

5. The method of claim 1, further comprising determining that a presentation of the content is incomplete when the screen sharing mode is ended on the computing device, and wherein the prompt is displayed on the display screen based on the presentation being incomplete when the screen sharing mode is ended on the computing device.

6. The method of claim 5, wherein determining that the presentation of the content is incomplete includes determining that at least a portion of a document being shared was not rendered for display on the display screen while the screen sharing mode was active on the computing device.

7. The method of claim 1, further comprising detecting, based on audio data captured by a microphone of the computing device and before the screen sharing mode is resumed on the computing device, that the user is addressing the content that was previously shared in the screen sharing mode, and wherein the prompt is displayed on the display screen of the computing device responsive to the user addressing the content that was previously shared.

8. A computing device, comprising:
   one or more display screens;
   at least one memory; and at least one processor coupled with the at least one memory and configured to cause the computing device to:

determine that a video conference session is active on the computing device in a screen sharing mode in which a user is sharing content displayed on the one or more display screens with a remote user connected to the video conference session via a remote device;

detect that the remote user has entered the screen sharing mode on the remote device, thereby ending the screen sharing mode on the computing device; and display a prompt on the one or more display screens that is selectable to resume the screen sharing mode on the computing device responsive to detecting that the remote user has ended the screen sharing mode on the remote device while a primary user interface of the video conference session was removed from the one or more display screens.

9. The computing device of claim 8, wherein the at least one processor is configured to cause the computing device to:

determine that the screen sharing mode is inactive in the video conference session; and display the prompt on the one or more display screens based on the screen sharing mode being inactive.

10. The computing device of claim 8, wherein the at least one processor is configured to cause the computing device to receive user input selecting the prompt, the user input effective to initiate the screen sharing mode on the computing device.

11. The computing device of claim 8, wherein the at least one processor is configured to cause the computing device to surface the primary user interface of the video conference session in response to the screen sharing mode being entered on the remote device while the primary user interface was removed from the one or more display screens.

12. A non-transitory computer-readable medium storing instructions, which when executed by a processor, cause the processor to perform operations comprising:

determining that a video conference session is active on a computing device in a screen sharing mode in which a user is sharing content displayed on a display screen associated with the computing device with a remote user connected to the video conference session via a remote device;

detecting that the remote user has entered the screen sharing mode on the remote device, thereby ending the screen sharing mode on the computing device; and displaying a prompt on the display screen that is selectable to resume the screen sharing mode responsive to detecting that the remote user has ended the screen sharing mode on the remote device while a primary user interface of the video conference session was removed from the display screen.

13. The non-transitory computer-readable medium of claim 12, the operations further comprising:

determining that a presentation of the content is incomplete when the screen sharing mode is ended on the computing device; and displaying the prompt on the display screen based on the presentation being incomplete when the screen sharing mode is ended on the computing device.

14. The non-transitory computer-readable medium of claim 12, the operations further comprising surfacing the primary user interface of the video conference session for display on the display screen in response to the remote user entering the screen sharing mode on the remote device, the primary user interface being surfaced based on the screen sharing mode having ended on the computing device while the primary user interface was removed from the display screen.

15. The method of claim 6, wherein determining that the presentation is incomplete includes determining that at least an additional portion of the document was rendered for display on the display screen while the screen sharing mode was active on the computing device.

16. The computing device of claim 8, wherein the computing device further comprises a microphone, and the at least one processor is configured to cause the computing device to:

determine that the user of the computing device is addressing content displayed on the one or more display screens by comparing the content to audio data captured by the microphone; and display the prompt responsive to determining that the user is addressing the content.

17. The computing device of claim 8, wherein the at least one processor is configured to cause the computing device to:

determine that the user of the computing device is addressing the content that was previously being shared in the screen sharing mode before the screen sharing mode was ended on the computing device; and display the prompt responsive to determining that the user is addressing the content that was previously shared.

18. The non-transitory computer-readable medium of claim 14, wherein surfacing the primary user interface of the video conference session includes displaying the primary user interface to at least partially cover the content that was previously shared in the screen sharing mode.

19. The non-transitory computer-readable medium of claim 12, wherein the computing device includes multiple display screens, the operations further comprising:

determining that the primary user interface of the video conference session is displayed on a first display screen of the multiple display screens while the user is primarily interacting with the content displayed on a second display screen of the multiple display screens; and surfacing the primary user interface of the video conference session for display on the second display screen in response to the remote user entering the screen sharing mode on the remote device.

20. The non-transitory computer-readable medium of claim 12, the operations further comprising:

determining that the primary user interface of the video conference session is partially covered by display content on the display screen; and surfacing the primary user interface of the video conference session to cover the display content in response to the remote user entering the screen sharing mode on the remote device.

\* \* \* \* \*